(12) United States Patent
Phanse et al.

(10) Patent No.: US 10,402,455 B1
(45) Date of Patent: Sep. 3, 2019

(54) LOCATION AND CONTENT BASED SEARCH FOR A MOBILE DEVICE

(71) Applicants: Viraj Phanse, San Jose, CA (US); Ameya Gawde, Bellevue, WA (US)

(72) Inventors: Viraj Phanse, San Jose, CA (US); Ameya Gawde, Bellevue, WA (US)

(*) Notice: Subject to any disclaimer, the term of this patent is extended or adjusted under 35 U.S.C. 154(b) by 0 days.

(21) Appl. No.: 16/377,222

(22) Filed: Apr. 7, 2019

(51) Int. Cl.
*G06F 16/909* (2019.01)
*G01C 21/34* (2006.01)
*G01C 21/36* (2006.01)
*G06F 16/9035* (2019.01)
*G06F 16/903* (2019.01)

(52) U.S. Cl.
CPC ....... *G06F 16/909* (2019.01); *G01C 21/3492* (2013.01); *G01C 21/3611* (2013.01); *G01C 21/3679* (2013.01); *G06F 16/9035* (2019.01); *G06F 16/90348* (2019.01)

(58) Field of Classification Search
CPC ............ G06F 16/909; G06F 16/90348; G06F 16/9035; G01C 21/00; G01C 21/26; G01C 21/3667; G01C 21/3682; G01C 21/3694; G01C 21/3476; G01C 21/3492; G01C 21/3611; G01C 21/3679
See application file for complete search history.

(56) References Cited

U.S. PATENT DOCUMENTS

| | | | |
|---|---|---|---|
| 7,756,903 B2 | 7/2010 | Kumar | |
| 7,920,965 B1* | 4/2011 | Nesbitt | G01C 21/00 |
| | | | 701/416 |
| 8,588,810 B2 | 11/2013 | Dai | |
| 10,317,219 B1* | 6/2019 | Borgerson | G01C 21/26 |
| 2007/0288511 A1* | 12/2007 | Zink | G06F 16/951 |
| 2009/0005968 A1* | 1/2009 | Vengroff | G06F 16/9537 |
| | | | 701/425 |
| 2009/0150349 A1* | 6/2009 | Cartin | G01C 21/3679 |
| 2009/0177384 A1* | 7/2009 | Walder | G01C 21/3682 |
| | | | 701/532 |
| 2010/0248746 A1* | 9/2010 | Saavedra | G01C 21/3407 |
| | | | 455/456.3 |

(Continued)

FOREIGN PATENT DOCUMENTS

| | | |
|---|---|---|
| EP | 3425530 A1 | 1/2019 |
| JP | 6181595 B2 | 8/2017 |

OTHER PUBLICATIONS

Jeongyeup Paek et al., Energy-Efficient Rate Adaptive GPS-based Positioning for Smartphones in the proceedings of MobiSys. Internet. Jun. 15, 2010.

(Continued)

*Primary Examiner* — James E Richardson
(74) *Attorney, Agent, or Firm* — Aslan Law, P.C.

(57) ABSTRACT

An apparatus receiving at least search strings, location data, time stamp data and additional data. Based on the received data, the apparatus calculates a number of display results, an average distance traveled, an average time taken, an average speed, an average time required, a first optimal radius, a region of overlap, a first revised optimal radius, and a second optimal radius. Based on the calculated data, the apparatus transmits first identification data, second identification data, a first number of search results for said first identification data, and a second number of search results for said second identification data, the first revised optimal radius, and the second revised optimal radius.

3 Claims, 9 Drawing Sheets

(56) References Cited

U.S. PATENT DOCUMENTS

| | | | |
|---|---|---|---|
| 2010/0305848 A1* | 12/2010 | Stallman | G06F 16/9537 701/465 |
| 2010/0318535 A1* | 12/2010 | Weber | G06Q 30/02 707/759 |
| 2011/0238301 A1* | 9/2011 | Lee | G01C 21/20 701/408 |
| 2012/0158289 A1* | 6/2012 | Bernheim Brush | G01C 21/3484 701/425 |
| 2014/0094197 A1* | 4/2014 | Kim | H04W 4/029 455/456.3 |
| 2015/0254277 A1* | 9/2015 | Campbell | G06F 16/29 715/771 |
| 2016/0012136 A1 | 1/2016 | Ben Zvi | |
| 2016/0061617 A1* | 3/2016 | Duggan | G06F 16/248 701/538 |
| 2018/0060979 A1 | 3/2018 | McNairn | |

OTHER PUBLICATIONS

Xu et al. Channel surfing and spatial retreats: defenses against wireless denial of service. Proceedings of the 2004 ACM Workshop on Wireless Security, WiSe. Philadelphia, Pennsylvania, USA. pp. 80-89. Oct. 1, 2004.

Maryam Kamvar et al., A Large Scale Study of Wireless Search Behavior: Google Mobile Search. Proceedings of the SIGCHI conference on Human Factors in computing systems (CHI). Montréal, Québec, Canada. pp. 1-9. Apr. 22-27, 2006.

Karen Church et al. Who, What, Where & When: A New Approach to Mobile Search. Proceedings of the 2008 International Conference on Intelligent User Interfaces, Gran Canaria, Canary Islands, Spain. pp. 309-312. Jan. 13-16, 2008.

Nicholas D Lane et al. Hapori: Context-based Local Search for Mobile Phones using Community Behavioral Modeling and Similarity. UbiComp 2010: Ubiquitous Computing, 12th International Conference, UbiComp 2010, Copenhagen, Denmark. Sep. 26, 2010.

Chris Veness, Calculate distance, bearing and more between Latitude/Longitude points. www.movable-type.co.uk/scripts/latlong.html pp. 1-10. Jan. 27, 2019.

Jeongyeup Paek et al., Energy-Efficient Rate Adaptive GPS-based Positioning for Smartphones in the proceedings of MobiSys. Proceedings of the 8th International Conference on Mobile Systems, Applications, and Services (MobiSys 2010), San Francisco, California, USA, Jun. 15-18, 2010.

\* cited by examiner

LOCATION AND CONTENT BASED SEARCH FOR A MOBILE DEVICE

FIELD OF THE INVENTION

The present disclosure generally relates to an information retrieval system for a mobile based search system. More specifically, the present disclosure generally relates to methods, systems, and computer program products relating to mobile based search systems that would benefit from a more adaptive, personalized and dynamic search mechanism.

BACKGROUND

Analysis of search patterns over mobile web on search interfaces designed specifically for the mobile environment presents a stark contrast to those observed on a terminal. The widespread rate of proliferation of mobile devices has only made the problem of mobile search an even more challenging one in terms of both scale and complexity. An attempt to resolve this was by leveraging the property of mobile phones; being able to search from anywhere, anytime. This led to the integration of context information like location and timestamps into the results that were generated. This led to the birth of the mapping/GPS software (like Google maps based search, the Yahoo oneSearch, etc.). In its native form, the Google Maps based search still has certain unresolved issues. Most of the local search results currently provided by commercially available search engine technologies only takes plain and simple location into consideration when processing the search query.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

An apparatus (and method and a non-transitory computer readable medium having instructions stored thereon, such that when the instructions are read and executed by one or more processors, said one or more processors is configured to perform the method and/or the process of the apparatus) of at least one embodiment of the present invention is an apparatus (and method and a non-transitory computer readable medium having instructions stored thereon, such that when the instructions are read and executed by one or more processors, said one or more processors is configured to perform the method and/or the process of the apparatus) which includes at least a receiving circuit and/or device configured to receive at least: a first set of data received in a single transmission wherein said first set of data received in said single transmission includes at least: i. a first search term corresponding to a first search query inputted by a user, ii. a second search term corresponding to a second search query inputted by the user, iii. first location data corresponding to a first location of said user, and iv. first time stamp data of said user, wherein said first time stamp data corresponds to said first location data, and a second set of data received in a single transmission wherein said second set of data received in said single transmission includes at least: i. second location data corresponding to a second location of said user, and ii. second time stamp data of said user, wherein said second time stamp data corresponds to said second location data, and wherein the second set of data received in a single transmission is received after the first set of data received in a single transmission; a storage circuit and/or device configured to store at least: said first search term corresponding to the first search query inputted by the user, said second search term corresponding to the second search query inputted by the user, said first location data corresponding to the first location of said user, said first time stamp data, said second location data corresponding to the second location of said user, and said second time stamp data; a calculation circuit and/or device configured to calculate at least: a number of display results (DOR) based on calculation using said first location data, wherein DOR is equal to or great than 3, an average distance traveled (ADT) based on using said first location data and/or said second location data, an average time taken (ATT) based on using said first time stamp data and/or second time stamp data, an average speed (AS) based on using said ADT and/or said ATT, an average time required (ATR) based on said DOR and/or said AS, a first optimal radius (OR1) based on said AS and/or said ATR, a region of overlap (ROVL) based on at least said first location data and said second location data, a first revised optimal radius (OR1a), wherein OR1a is equal to OR1 added to ROVL, a second optimal radius (OR2) based on OR1, wherein OR2 is equal to a value of 1.25*OR1, or a value of equal to 1.50*OR1 or a value between 1.25*OR1 and 1.50*OR1, and a second revised optimal radius (OR2a) based on OR1 a, wherein OR2a is equal to a value of 1.25*OR1 a, or a value of equal to 1.50*OR1a or a value between 1.25*OR1a and 1.50*OR1a; and a transmitting circuit and/or device configured to transmit at least: a first identification data, wherein said first identification data being one of a first icon, a first thumbnail or a first image, wherein said first icon, said first thumbnail or said first image corresponding to said first search term, a second identification data, wherein said second identification data being one of a second icon, a second thumbnail or a second image, wherein said second icon, said second thumbnail or said second image corresponding to said second search term, a first number of search results for said first identification data, and a second number of search results for said second identification data, wherein said first number of search results for said first identification data and said second number of search results for said second identification data are locations results located within said first revised optimal radius and/or said second revised optimal radius, wherein the total number of search results is equal to said first number of search results and said second number of search results, wherein said total number of search results is equal to DOR, and wherein said first identification data is different data than said second identification data, the first revised optimal radius, and the second revised optimal radius.

A method of at least one embodiment of the present invention is a method which includes are least the steps of receiving a first set of data received in a single transmission wherein said first set of data received in said single transmission includes at least: i) a first search term corresponding to a first search query inputted by a user, ii) a second search term corresponding to a second search query inputted by the user, and iii) first location data corresponding to a first location of said user; receiving a second set of data received in a single transmission wherein said second set of data received in said single transmission includes at least: i) second location data corresponding to a second location of said user, wherein the second set of data received in a single transmission is received after the first set of data received in a single transmission; calculating a number of display results (DOR) based on calculation using said first location data, wherein DOR is equal to or great than 3; calculating an average distance traveled (ADT) based on using said first location data and/or said second location data; calculating an average speed (AS) based on using said ADT; calculating an average time required (ATR) based on said DOR and/or said AS; calculating a first optimal radius (OR1) based on said AS and/or said ATR; calculating a region of overlap (ROVL) based on at least said first location data and said second location data; calculating a first revised optimal radius (OR1a), wherein OR1a is equal to OR1 added to ROVL; calculating a second optimal radius (OR2) based on OR1, wherein OR2 is equal to a value of 1.25*OR1, or a value of equal to 1.50*OR1 or a value between 1.25*OR1 and 1.50*OR1; calculating a second revised optimal radius (OR2a) based on OR1 a, wherein OR2a is equal to a value of 1.25*OR1 a, or a value of equal to 1.50*OR1a or a value between 1.25*OR1a and 1.50*OR1a; transmitting a first identification data, wherein said first identification data being one of a first icon, a first thumbnail or a first image, wherein said first icon, said first thumbnail or said first image corresponding to said first search term; transmitting a second identification data, wherein said second identification data being one of a second icon, a second thumbnail or a second image, wherein said second icon, said second thumbnail or said second image corresponding to said second search term; transmitting a first number of search results for said first identification data; transmitting a second number of search results for said second identification data, wherein said first number of search results for said first identification data and said second number of search results for said second identification data are locations results located within said first revised optimal radius and/or said second revised optimal radius, wherein the total number of search results is equal to said first number of search results and said second number of search results, wherein said total number of search results is equal to DOR, and wherein said first identification data is different data than said second identification data; transmitting the first revised optimal radius; and transmitting the second revised optimal radius.

A non-transitory computer readable medium of at least one embodiment of the present invention where the non-transitory computer readable medium having instructions stored thereon, such that when the instructions are read and executed by one or more processors, said one or more processors is configured to perform at least the steps of receiving a first set of data received in a single transmission wherein said first set of data received in said single transmission includes at least: i) a first search term corresponding to a first search query inputted by a user, ii) a second search term corresponding to a second search query inputted by the user, and iii) first location data corresponding to a first location of said user; receiving a second set of data received in a single transmission wherein said second set of data received in said single transmission includes at least: i) second location data corresponding to a second location of said user, wherein the second set of data received in a single transmission is received after the first set of data received in a single transmission; calculating a number of display results (DOR) based on calculation using said first location data, wherein DOR is equal to or great than 3; calculating an average distance traveled (ADT) based on using said first location data and/or said second location data; calculating an average speed (AS) based on using said ADT; calculating an average time required (ATR) based on said DOR and/or said AS; calculating a first optimal radius (OR1) based on said AS and/or said ATR; calculating a region of overlap (ROVL) based on at least said first location data and said second location data; calculating a first revised optimal radius (OR1a), wherein OR1a is equal to OR1 added to ROVL; calculating a second optimal radius (OR2) based on OR1, wherein OR2 is equal to a value of 1.25*OR1, or a value of equal to 1.50*OR1 or a value between 1.25*OR1 and 1.50*OR1; calculating a second revised optimal radius (OR2a) based on OR1 a, wherein OR2a is equal to a value of 1.25*OR1a, or a value of equal to 1.50*OR1a or a value between 1.25*OR1a and 1.50*OR1a; transmitting a first identification data, wherein said first identification data being one of a first icon, a first thumbnail or a first image, wherein said first icon, said first thumbnail or said first image corresponding to said first search term; transmitting a second identification data, wherein said second identification data being one of a second icon, a second thumbnail or a second image, wherein said second icon, said second thumbnail or said second image corresponding to said second search term; transmitting a first number of search results for said first identification data; transmitting a second number of search results for said second identification data, wherein said first number of search results for said first identification data and said second number of search results for said second identification data are locations results located within said first revised optimal radius and/or said second revised optimal radius, wherein the total number of search results is equal to said first number of search results and said second number of search results, wherein said total number of search results is equal to DOR, and wherein said first identification data is different data than said second identification data; transmitting the first revised optimal radius; and transmitting the second revised optimal radius.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
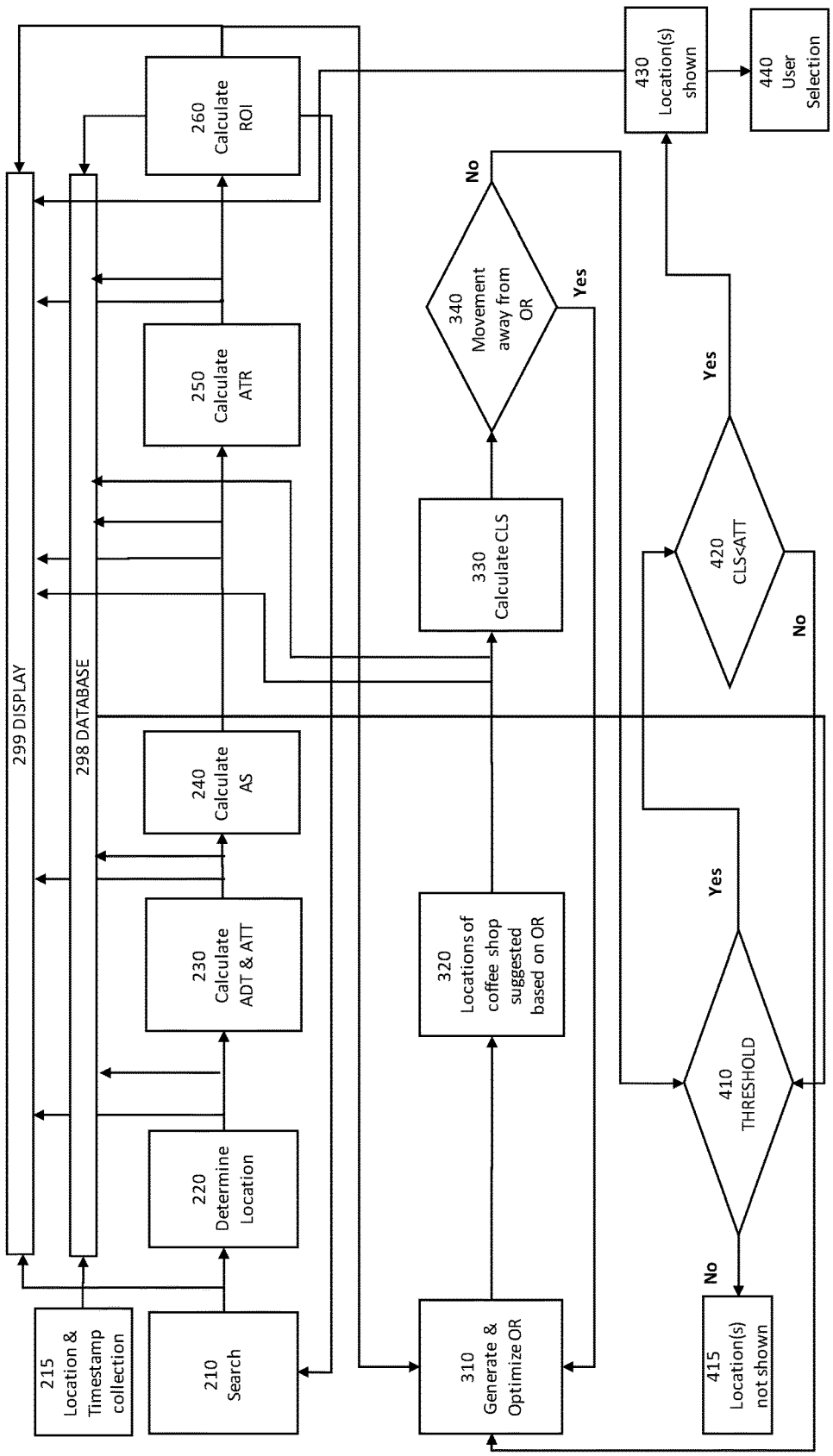
FIG. 1 is a functional block diagram illustrating the system according to one or more embodiments described herein.

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

This disclosure is not limited to the particular systems, devices and methods described, as these may vary. The terminology used in the description is for the purpose of describing the particular versions or embodiments only, and is not intended to limit the scope. Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Descriptions of well-known starting materials, processing techniques, components and equipment may be omitted so as not to unnecessarily obscure the invention in detail. It should be understood, however, that the detailed description and the specific examples, while indicating (e.g., preferred) embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Before discussing specific embodiments, embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.) or the like. In various embodiments, the computer has access to at least one database over the network.

ROM, RAM and HD are computer memories for storing data and computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

The following terms shall have, for the purposes of this application, the respective meanings set forth below.

A "user" refers to one or more entities or people using any of the components and/or elements thereof as described herein. In some embodiments, the user may be a user of an electronic device. In other embodiments, the user may be a user of a computing device. Users described herein are generally either creators of content, managers of content, merchants, and/or consumers. For example, a user can be an administrator, a developer, a group of individuals, a content provider, a consumer, a merchant, a representative of another entity described herein, and/or the like.

An "electronic device" refers to a device that includes a processor and a tangible, computer-readable memory or storage device. The memory may contain programming instructions that, when executed by the processing device, cause the device to perform one or more operations according to the programming instructions. Examples of electronic devices include personal computers, supercomputers, gaining systems, televisions, mobile devices, medical devices, recording devices, and/or the like.

A "mobile device" refers to an electronic device that is generally portable in size and nature or is capable of being operated while in transport. Accordingly, a user may transport a mobile device with relative ease. Examples of mobile devices include pagers, cellular phones, feature phones, smartphones, personal digital assistants (PDAs), cameras, tablet computers, phone-tablet hybrid devices ("phablets"), laptop computers, netbooks, ultrabooks, global positioning satellite (GPS) navigation devices, in-dash automotive components, media players, watches, and the like.

A "computing device" is an electronic device, such as a computer, a processor, a memory, and/or any other component, device or system that performs one or more operations according to one or more programming instructions.

A "user interface" is an interface which allows a user to interact with a computer or computer system. A user interface may generally provide information or data to the user and/or receive information or data from the user. The user interface may enable input from a user to be received by the computer and may provide output to the user from the computer. Accordingly, the user interface may allow a user to control or manipulate a computer and may allow the computer to indicate the effects of the user's control or manipulation. The display of data or information on a display or a graphical user interface is a non-limiting example of providing information to a user. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are non-limiting examples of user interface components which enable the receiving of information or data from a user.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

The functions of the various devices described herein with respect to at least FIG. 1 represents an improvement in the functionality of general computing devices known in the art, and thus teach significantly more than existing technology, by providing an ability to efficiently provide a more adaptive, personalized and dynamic search mechanism. Such devices may include a plurality of components, such as the components described herein with respect to at least FIG. 9. The functions of the various devices described herein with respect to at least FIG. 1 may also provide entities with an ability to efficiently provide a more adaptive, personalized and dynamic search mechanism that were previously non-existent and would not be possible without the various computing devices, server devices and electronic devices herein. Such adaptive, personalized and dynamic search mechanism would not be feasible without implementation of the devices described herein.

This system leverages at least timestamp(s) and location (coordinates, content, etc.) to provide a more adaptive, personalized and dynamic search mechanism. This system provides numerous benefits and considerations, for example, this system is energy efficient with use of searching via a cellular phone by using Rate Adaptive Positioning, etc. One of the goals of the present invention is to handle the issue of mobility in the context of searches made from mobile devices like mobile phones (improving over current technology where current search engines handle by incorporating 'location context' in the search results provided.) The present invention provides a more adaptive, personalized and dynamic search technique where, for example, each user is returned a subset of the results that are returned currently, in a procedure that reflects updates in the search results as the user is moving.

The current technology allows a user to search for a coffee shop from a mobile device app where a list of options may be presented to the user. However, one of the problems facing the current technology is that the search is performed when a user is driving.

One of the many problems that the present invention is designed to solve is where the user is presented with a coffee shop result or results when driving but the user ends up driving past that particular coffee shop or shops. The user can end up missing those suggested coffee shop(s) for numerous possible reasons, like the user was multitasking, the user was not paying attention, etc. The present invention provides an option for automatic adaptation of the existing user search to a new location and/or a (recursive) moving location of the user where the new results is displayed in manner of a constant refreshing of search results displayed to the user.

FIG. 1 is a functional block diagram illustrating the present invention according to one or more embodiments described herein.

Figure 2:
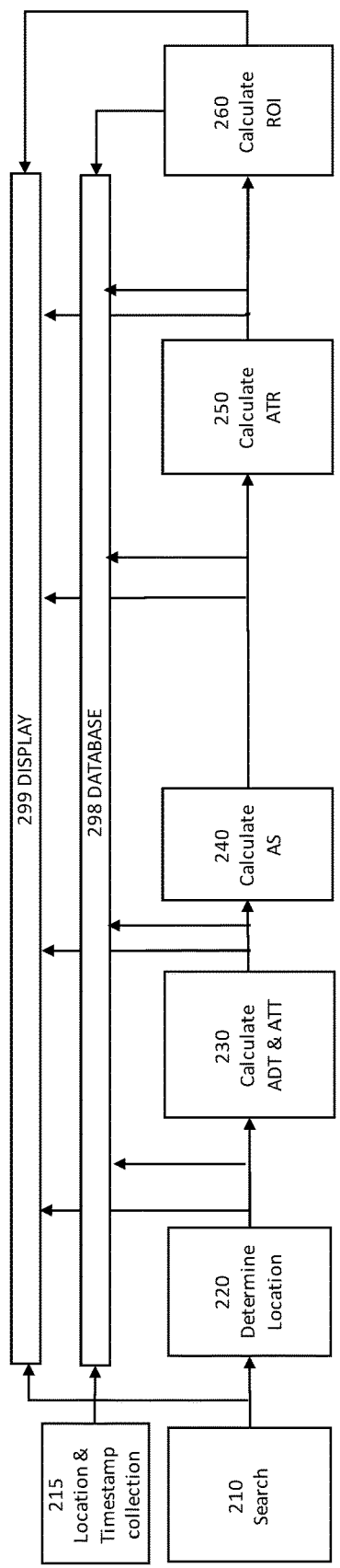
FIG. 2 is a functional block diagram illustrating the computation of the Region of Influence (ROI) according to one or more embodiments described herein.

FIG. 2 is a functional block diagram illustrating the computation of the Region of Influence (ROI) according to one or more embodiments described herein.

In at least one embodiment, the present invention as disclosed in at least FIG. 2 may include a Search and Displaying of Results step/unit 210, a Location and Timestamp Determining and Collection step/unit 215, a Location Determining step/unit 220, an Average Distance Travelled & Average Time Taken Calculation step/unit 230, an Average Speed Calculation step/unit 240, an Average Time Required Calculation step/unit 250, and/or ROI Calculation step/unit 260. It should be noted that a "unit" as disclosed in the present disclosure may be a circuit and/or device.

In step/unit 210, a user (at a certain location, e.g., currently driving westbound on Santa Monica Blvd in Westwood California) performs a search of (desired) category on, for example, a mobile device like a cellular phone (or a device integrated directly into the car, etc.). This desired category may be anything desired by a user, for example a (type of) product, a (type of) service, a (type of) location, etc. For example, a type of service may be an oil change for automobiles, while a type of location may be a park, while a type of business may be a grocery store and while a type of product may be coffee. There may be hybrid categories like "coffee" which may result in coffee ground dealers and coffeeshops which sell coffee by the cup. The user may be using any device such as a mobile device, an integrated system for an on-road/off-road vehicle system, etc.

It should be noted that any and/or all of the user interactions with the system may be displayed in Display 299 (and/or stored in Database 298). For example, the searching, the outputs of any and/or all of the units (210, 215, 220, etc.), may be displayed in Display 299 (and/or stored in Database 298) so that the user can visualize the process.

In at least one embodiment, the search (e.g., "Coffee shop") performed in 210 may provide a display of a number of results, "DOR" results (or at least DOR results), on Display 299. The number of results (or the displayed number of results) "DOR" can be a predetermined or preprogrammed number programmed or entered into the system, like DOR=10. In addition, the user and/or the system can decide (or overwrite a previous DOR selection or programming) at any time what the value of DOR will be. Furthermore, the value of DOR can be automatically calculated based on factors like city density, city population, and/or etc. For example, DOR may be calculated by at least the following equation:

$$DOR = (Pc/Ac)/1000, \text{ where}$$

Pcc is the population of current (searched) city, and
Ac is the area of the current (searched) city ($mi^2$).

Pcc and Ac may be obtained by any means, for example by information stored in the database, information stored in the user device, third party applications (Google, etc.), etc.

In at least one embodiment, the search performed in 210 may also provide each result displayed on Display 299 along with the average (or estimated) time and/or distance to reach each resultant. For example, if a search was performed for "coffee shops" with DOR being selected by the user to be 3, a display of the three closest coffee shops will be displayed, for example as 3 images each representing an icon of the search term (as a "coffee" icon). Accordingly, each of the closest coffee shop icons will also have an average (or estimated) distance and/or an average (or estimated) time to location being displayed.

In at least one embodiment, the average (or estimated) time and/or distance to reach each resultant may be obtained by any means e.g., via the database, an API (e.g., Google), any third-party platform, and/or etc. The database may also retrieve/calculate and store the average (or estimated) time and/or distance to reach each resultant by other means like an API (e.g., Google), any third-party platform, and/or etc.

In at least one embodiment, if a plurality of different search terms are separately but jointly entered where two separate searches to be performed together (e.g., "coffee shops" in a first search line/string and "pet stores" in a second search line/string) then the system may display two different icons where each displayed icon corresponds to each specific search term used ("e.g., a hot beverage icon for a search of "coffee" and/or "tea," a dog bone icon or a dog icon for a search of "pet store," etc.). One of many benefits of this search is that the user can quickly and more easily determine which of the user's two desired locations is preferable.

In embodiments having more than one search parameters used (e.g., "coffee shops" in a first search line/string and "pet stores" in a second search line/string), the search results may be display with DOR number of results for each search parameter.

In addition, in embodiments having more than one search parameters used (e.g., "coffee shops" in a first search line/string and "pet stores" in a second search line/string), the search results may be display for each search term by dividing the DOR by the number of results for each search parameter. For example, if the system uses a DOR of 9 and the user searches for "coffee" in a first line, "pet stores" in a second line and "grocery stores" in a third line, the display for results for each search displayed would be 3 (9/3=3). If the DOR was 10 in this example, then the system would use rounding (10/3=3.33 which results in 3).

The result(s) (e.g., initial user location, search term(s), timestamp(s) (e.g., the recorded time associated with the user being at a certain location), etc.) of 210 are provided to at least Database 298 and/or to 220 and/or stored locally in the user's device. For example, the result(s) of the search is outputted and displayed on Display 299 where DOR "coffee shops" are illustrated on the Display. Display 299 can be any type of display (e.g., a display on a mobile phone, a screen in the automobile, a projection in the automobile, etc.). The result(s) and/or any and all data collected in 210 may be locally stored in the user device, and/or stored in the database.

In 220, an initial user location (e.g., data corresponding to latitude and longitude) is obtained (e.g., at regular time intervals) and transmitted (e.g., at regular time intervals) via the mobile device to Database 298 when the user submits the search (and/or executes/opens the app). The initial user location may be obtained in and/or conjunction with 215. The user's location (e.g., as the user location changes) is constantly provided to the database in order to update the user's location (and direction, etc.) in the database (e.g., by at least 215). The database stores the user' transmitted data (including location data) as records. Accordingly, the database may be a history storage database that stores all historical data corresponding to the user.

It should be noted that the user device and the Database 298 may communicate with each other directly and/or indirectly via a Base Station as illustrated in the Figures.

In at least one embodiment, step/unit 210 and step/unit 220 may work in conjunction with and/or independently from step/unit 215. In 215, the user device obtains the user location and the timestamp corresponding to each location obtained. The result(s) and/or any and all data collected in 215 may be locally stored in the user device, and/or stored in the database.

In at least one embodiment, the timestamps (e.g., the recorded time associated with the user being at a certain location) may be (constantly) collected at the user's mobile device and (constantly) provided to Database 298 (e.g., via 220). For example, the user's mobile device may simultaneously capture and simultaneously transmit the user location along with the timestamps (corresponding to the captured location) to the database.

It should be noted that a location and/or a series of locations as search results may be obtained using any and/or all contemporary search technologies.

The estimated wait time(s) for each resultant (e.g., the estimated wait time to go in each "coffee shop" and leave with your order) (in addition to the distance to each resultant location, the estimated time to each resultant location, etc.) may also be displayed to the user. The estimated wait time(s) (in addition to the distance to each resultant location, the estimated time to each resultant location, etc.) may be obtained by any means, e.g., the database, an API (e.g., Google), any third-party platform, and/or etc. The database may retrieve/calculate and store the estimated wait time(s) by other means like an API (e.g., Google), any third-party platform, and/or etc.

The database may be updated with user data (user location and timestamps, etc.) at any desired intervals and/or in any programmed intervals. For example, the database may be updated every time the user invokes/activates the (map)

application on the mobile device. In at least one embodiment, any user data (e.g., user location and timestamps, etc.) may be (constantly) collected at the user's mobile device and (constantly) provided to Database 298 (and/or stored locally on the user device).

The result(s) of 220 are provided to at least Database 298 and/or to 230 and/or stored locally in the user's device. Based on the data collected and/or calculated/determined in 220, the display results on Display 299 may be updated. For example, the user's location along with the wait times, etc. are updated on the Display. The result(s) and/or any and all data collected in 220 may be locally stored in the user device, and/or stored in the database.

In 230, the database may use the stored records of the user to calculate the average distance traveled (ADT) and/or average time taken (ATT) using for example Haversine formula and/or timestamps.

It should be noted that the present invention may use a calculation circuit and/or device to calculate and/or determine many factors (e.g., average time, average distance, average speed, etc.). The calculation circuit and/or device may be located in the user device and/or the Database and/or another location (hence multiple calculation circuits and/or devices in the system). It should also be noted that if a calculation is performed outside of the user device, the calculation may be transmitted to the user device for the user device to use that calculation.

In at least one embodiment, the calculation circuit and/or device (or the user device and/or the Database and/or etc.) calculates the average distance travelled (ADT) using for example the Haversine formula and calculates the average time taken (ATT) by using for example the time stamp data.

For example, accordingly to at least one embodiment, the average distance travelled (ADT) may be calculated with the following formula:

ADT=sum of all distances the user travelled/the number of trips taken by the user.

For example, accordingly to at least one embodiment, the average time taken (ATT) may be calculated with the following formula:

ATT=sum of all time the user travelled/the number of trips taken by the user.

The (sum of all) distances the user has travelled may be obtained by or provided to the user device (e.g., by the calculating device/circuit, and/or by the storage device/circuit, and/or etc.) and/or the database keeping track of this data. More specifically, the present invention will obtain and store all of the distances the user travelled. For example, the first time the user uses the system/method, the distance traveled is collected and recorded in the user device and/or the database. Thereafter, each time the user uses the system/method, the distances traveled are collected and recorded in the user device and/or the database. The data for obtaining/calculating the sum of all distances the user travelled and the data for obtaining/calculating the number of trips taken by the user may be obtained by, for example, 215, 220 and/or 230.

Similarly, the total number of trips the user has taken may be obtained by or provided to the user device (e.g., by the calculating device/circuit, and/or by the storage device/circuit, and/or etc.) and/or the database keeping track of this data. More specifically, the present invention will obtain and store the total number of trips the user has taken. For example, the first time the user uses the system/method, the trip data is collected and recorded in the user device and/or the database. Thereafter, each time the user uses the system/method, each trip is collected and recorded in the user device and/or the database so the system/method can calculate the total number of trips taken by the user.

As an example, according to at least one embodiment, a user searches for coffee shop (by entering any related/corresponding search terms like "coffee," "coffee near me," "espresso," "latte," "mocha," "Starbucks," "tea," "coffeeshop," and/or etc.) as per 210. The user's initial location at the time of search along with the associated timestamp and the user's locations at certain time intervals along with the associated timestamps are obtained and sent to the database 298 (via 215 and/or 220). From the database 298, the pairs of latitudes and longitudes traversed by the user in all historical trips are retrieved. Using for example the Haversine formula, distance for each historical trip is calculated. A sum of all such distances is then calculated. The sum obtained is then divided by the total number of trips. The average distance travelled (ADT) is hence obtained. In this example, if we consider that the user has made two trips, then data of these two trips is stored in database 298. If, for example, the latitude and longitude of trip 1 is 34 03 59N, 118 53 22 W and 34 05 38N, 118 47 12 W respectively. Then, the distance travelled in trip 1 as per Haversine formula is 6.17 miles. If, for example, the latitude and longitude of trip 2 is 34 03 59N, 118 53 22 W and 34 00 28N, 118 24 03 W respectively, then the distance travelled in trip 2 as per Haversine formula is 28.26 miles. Accordingly, the sum of distances travelled in trip 1 and trip 2 is calculated to be 34.43 miles. Dividing this sum by total number of trips i.e., 2 (trips) would provide a calculated result of the average distance travelled (ADT) to be 17.215 miles.

In at least one embodiment, the latitude and longitude coordinates from the database may be used to compute the average distance traveled (ADT) by the user in trips the user has made in the past; this can be performed by using for example, the Haversine formula (or the like).

For example, accordingly to at least one embodiment, the average distance traveled (ADT) may be calculated with the following formula(s):

$\Theta = d/r$, where the central angle ($\Theta$) between any two points on a sphere may be the e distance between the two points (d) divided by the radius of the sphere (r), wherein the haversine formula hav of $\Theta$ is given by:

$hav(\Theta) = hav(\gamma 2 - \gamma 1) + \cos(\gamma 1)\cos(\gamma 2)hav(\lambda 2 - \lambda 1)$, where $\gamma 1, \gamma 2$ is the latitude of point 1 and latitude of point 2, and $\lambda 1, \lambda 2$ is the longitude of point 1 and longitude of point 2.

Finally, the haversine function (half a versine) of an angle θ (applied above to the differences in latitude and longitude) is:

$hav(\theta) = \sin^2(\theta/2) = (1 - \cos(\theta))/2$.

To solve for the distance d, apply the inverse haversine hav-1 to the central angle $\Theta$ or use the arcsine (inverse sine) function:

$d = r \, hav^{-1}(h) = 2r \arcsin(\sqrt{h})$, where h=hav(θ), or more explicitly:

$d = 2r \arcsin(\sqrt{(hav(\gamma 2 - \gamma 1) + \cos(\gamma 1)\cos(\gamma 2)hav((\lambda 2 - \lambda 1))}$ $= 2r \arcsin(\sqrt{(\sin^2((\gamma 2 - \gamma 1)/2) + \cos(\gamma 1)\cos(\gamma 2)\sin^2(((\lambda 2 - \lambda 1)/2))}$.

When using this formula, one must ensure that h does not exceed 1 due to a floating-point error (d is only real for h from 0 to 1). h only approaches 1 for antipodal points (on opposite sides of the sphere)—in this region, relatively large numerical errors tend to arise in the formula when finite precision is used. Because d is then large (approaching πR, half the circumference) a small error is often not a major concern in this unusual case (although there are other great-circle distance formulas that avoid this problem). (The formula above is sometimes written in terms of the arctangent function, but this suffers from similar numerical problems near h=1.) A similar formula may also be written using cosines (sometimes called the spherical law of cosines, not to be confused with the law of cosines for plane geometry) instead of haversines, but if the two points are close together (e.g. a kilometer apart, on the Earth) you might end up with cos(d/R)=0.99999999, leading to an inaccurate answer. Since the haversine formula uses sines, it avoids that problem. Either formula is only an approximation when applied to the Earth, which is not a perfect sphere: the "Earth radius" R varies from 6356.752 kin at the poles to 6378.137 kin at the equator. More importantly, the radius of curvature of a north-south line on the earth's surface is 1% greater at the poles (≈6399.594 kin) than at the equator (≈26335.439 km)—so the haversine formula and law of cosines cannot be guaranteed correct to better than 0.5%. More accurate methods that consider the Earth's ellipticity are given by Vincenty's formulae and the other formulas. Accordingly, it is noted that any formula(s) may be used to calculate these values any the examples using the haversine formula is only for illustration purposes.

As an example, according to at least one embodiment, a user searches for coffee shop (by entering any related/corresponding search terms like "coffee," "coffee near me," "espresso," "latte," "mocha," "Starbucks," "tea," "coffeeshop," and/or etc.) as per 210. The user's initial location at the time of search along with the associated timestamp and the user's locations at certain time intervals along with the associated timestamps are obtained and sent to the database 298 (via 215 and/or 220). From the database 298, the pairs of timestamps traversed by the user in all historical trips (in this example, we consider that only two timestamps in total are collected and stored) are retrieved. The time required for each historical trip is then calculated by obtaining the difference between the two timestamps. A sum of all such times is then calculated. Then the sum obtained is divided by the total number of trips. The average time taken (ATT) is the resultant. In this example, it is assumed that the user has made only two trips. Therefore, the data of these two trips is obtained and stored in 298. In addition, in this example, the timestamp for the two locations in trip 1 is Location 1=9:00:00 and Location 2=9:05:00 (HH:MM:SS, HH=hour, MM=minute, and SS=second). Therefore, the time taken Time 1=for trip 1 is the difference between the two timestamps and that results in the calculation of 5 minutes. Furthermore, in this example, the timestamp for the two locations in trip 2 is 12:00:00 and 12:15:00. Therefore, the time taken for trip 2 is the difference between the two timestamps and that results in the calculation of 15 minutes. Accordingly, the sum of times for the two trips is calculated to be 20 minutes. Then dividing this sum by the number of trips (i.e., 2) gives us the average time taken (ATT)=10 minutes.

It should be noted that the average distance travelled (ADT) and/or average time taken (ATT) may be calculated for example by the calculation circuit and/or device located in the user device and/or the Database and/or another location.

The result(s) of 230 are provided to at least Database 298 and/or to 240 and/or stored locally in the user's device. Based on the data collected and/or calculated/determined in 230, the display results on Display 299 may be updated. The result(s) and/or any and all data collected in 230 may be locally stored in the user device, and/or stored in the database.

In 240, the average speed (AS) is calculated. In at least one embodiment, the average speed AS may be calculated by dividing the average distance travelled ADT (e.g., as obtained in 230) by the average time taken ATT (e.g., as obtained in 230). Accordingly, the average speed (AS) may be calculated via the following formula:

AS=ADT/ATT.

The average speed may be calculated for example by the calculation circuit and/or device located in the user device and/or the Database and/or another location.

In at least one embodiment, dividing ADT by the average time in which this distance is covered obtained from the corresponding timestamp information in the same database gives us the average speed at which the user travels or has traveled in previous trips."

It should be noted that a location and/or a series of locations as search results may be obtained using any and/or all contemporary search technologies. It should also be noted that in addition to these locations obtained, average distances and times to resultant places (e.g., coffee shops results) from the place where the search has been made may also be presented to the user. Therefore, an aggregated result(s) of the data may be presented to the user, for example a combination of ADT and the AS may be presented to the user.

The result(s) of 240 are provided to at least Database 298 and/or to 250 and/or stored locally in the user's device. Based on the data collected and/or calculated/determined in 240, the display results on Display 299 may be updated. The result(s) and/or any and all data collected in 240 may be locally stored in the user device, and/or stored in the database.

In 250, the average time required (ATR) to reach those DOR results/locations (e.g., DOR=10) closest locations from the user's current (or most recent) location (or DOR suggested locations from the user's current (or most recent) location) is calculated and/or obtained based on the search performed in 210. In at least one embodiment, the average time required (ATR) may be obtained from an outside source like Google, Yahoo, etc.

For example, accordingly to at least one embodiment, the average time required (ATR) may be calculated with the following formula:

ATR=Distance between user's current location to DOR/AS.

For example, if (the number of results) DOR is 2, the ATR would be the distance between the user's current location to 2 different locations. For example, if (the number of results) DOR is 3, the ATR would be the distance between the user's current location to 3 different locations.

The result(s) of 250 are provided to at least Database 298 and/or to 260 and/or stored locally in the user's device. Based on the data collected and/or calculated/determined in 250, the display results on Display 299 may be updated. The result(s) and/or any and all data collected in 250 may be locally stored in the user device, and/or stored in the database.

In 260, the region of influence (ROI) is calculated by multiplying the average speed AS (e.g., from 240) and the average time ATR (e.g., from 250). For example, the ROI may be calculated by at least the following equation:

$$ROI = AS * ATR.$$

In at least one embodiment, the ROI may be calculated for example by the calculation circuit and/or device located in the user device and/or the Database and/or another location. It should be noted that the present invention may instead calculate and use a Radius of Influence instead of calculating and using a Region of Influence.

In at least one embodiment, the region of influence (ROI) may be used as a (e.g., circular) display illustrating the area of desired search results. For example, the region of interest (e.g., ROI) can be defined as the circular region within which search results for the search query that was performed that is to be displayed.

The result(s) of 260 are provided to at least Database 298 and/or to 310 and/or stored locally in the user's device. Based on the data collected and/or calculated/determined in 260, the display results on Display 299 may be updated. The result(s) and/or any and all data collected in 260 may be locally stored in the user device, and/or stored in the database.

In at least one embodiment, the result(s) of 260 are provided to at least 260. Accordingly, the use of the feedback results of 260 may be used in 210 and/or any proceeding step (220 and/or 230 and/or 240 and/or 250 and/or 260 and/or etc.). For example, if the ROI calculated is 1 mile from user's location, this calculation can be used in 210 for searching for all the locations of the coffee shops within 1 mile from the user's location. This calculated ROI can further be used in proceeding steps.

Figure 3:
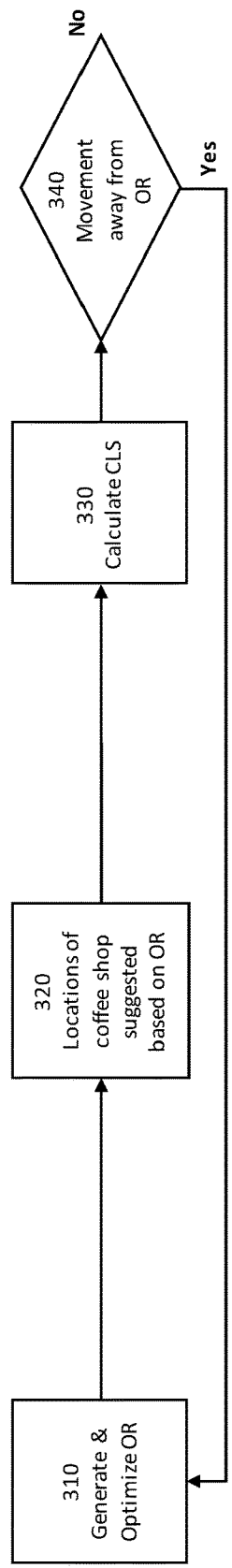
FIG. 3 is a functional block diagram illustrating the computation of optimal radius (OR) according to one or more embodiments described herein.

FIG. 3 is a functional block diagram illustrating the computation of optimal radius (OR) according to one or more embodiments described herein.

The procedure(s)/step(s) in at least FIG. 3 provide numerous benefits. For example, by determining the ROI and optimizing the OR, the system reduces the error rate in the personalized dynamic search.

In 310, the average radius of the ROI is added to a standard deviation of the average distance the user covers to generate/calculate the optimal radius (OR) within which all the search results for a given query in a particular area needs to be displayed.

It can be expected that large variations in acceleration may occur in the current user's journey. Accordingly, a sudden increase in the user's traveling speed over a period of time would result in the optimal radius (OR) of the region of influence (ROI) not adapting and/or scaling well. This may be at least partially due to the OR having to rely on a database of location coordinates and timestamps of the particular user in the user's previous trips. In order to account for the current acceleration, if the user's velocity (and/or speed, and/or acceleration, and/or etc.) surpassed a predetermined threshold, the OR is scaled/adjusted accordingly.

For example, according to at least one embodiment, if the velocity of the user at least doubles (which has a bearing on the average speed of the user) the OR is scaled based on, for example, the following formula:

$$OR(n) = OR(n-1) * (1 + (|Acc| * Tacc) / CS), \text{ where}$$

n is the current interval of time,
Acc is the acceleration of the user (the user's device),
Tacc is the time over which acceleration was made, and
CS is the current speed of the user (the user's device).

One of the many benefits of the present invention is that this dynamic computation of the optimal radius (OR) ensures the user does not get a new set of search results too quickly and there is a fair amount of consistency over a period of time which bears well with the user and does not confuse the user.

Figure 5:
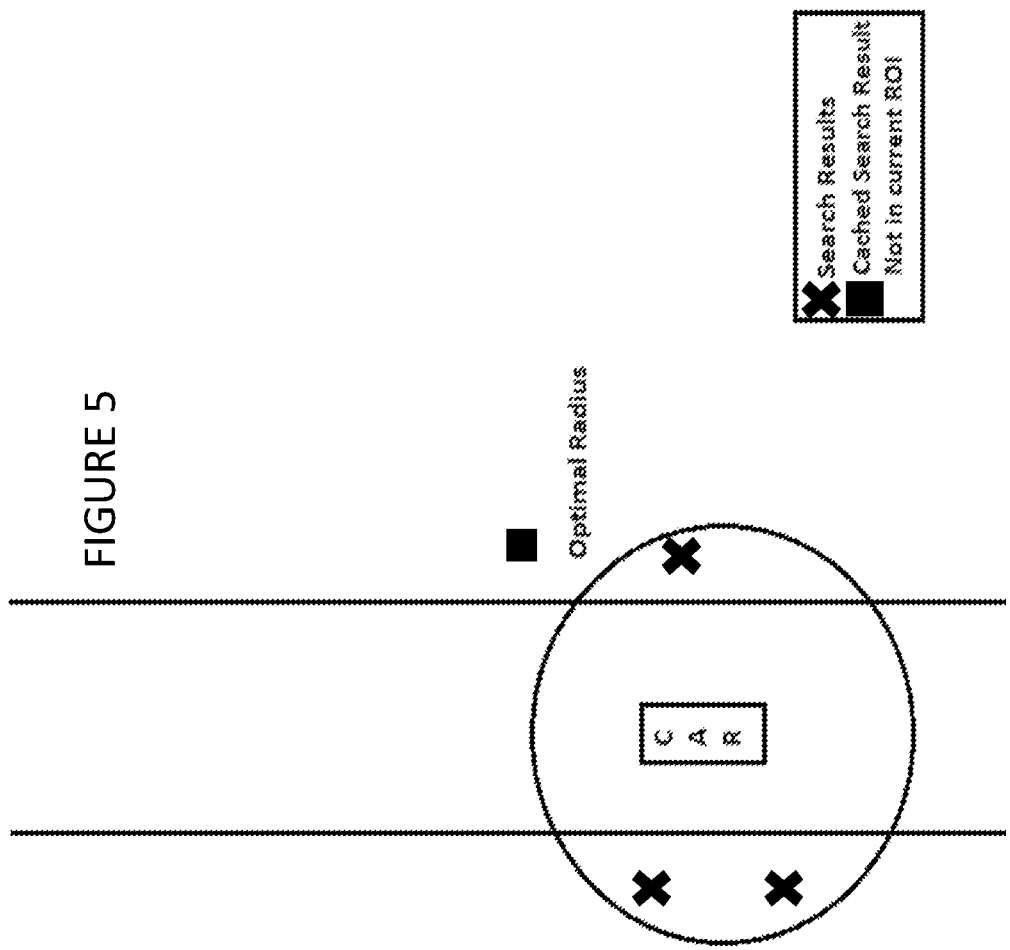
FIG. 5 is sample illustration of the display presented to the user according to one or more embodiments described herein.

For example, consider an instance when the user is traveling on a freeway and the user desires to perform a search for "Soda." The present invention, according to at least one embodiment, will construct an ROI for the user to visually view and also display all the Soda centers in that area of interest (or all the DOR results). However, if the user happens to miss an exit (or drives past the desired result, etc.) when in a hurry then the user may much rather go to another center that sells Soda instead of the one location the user just missed by having to turn around (being very inconvenienced). Thus, as illustrated in FIG. 5, as the user's device/car (always lies at the center of the displayed ROI) along with the imaginary displayed ROI that surrounds the user's car moves, and a new search result that matches the search query falls into the ROI then a localized refreshed is made to display the newly added result as shown in FIG. 5.

In at least one embodiment, the OR may also be influenced by the user's constant presence in a geographical location. For example, the user's location may be tracked to obtain an area which the user has been tracked to spend at least 75% (or 80%, or 90%, or etc.) of his logged time in, this area may be referred to as the user's local geographic area (or "LGA"). If there is a region of overlap between the calculated OR and the LGA (hereinafter ROVL), then the ROVL may be used in the recalculation of OR. For example, if the ROVL is between 10 and 25% of the OR (and/or the LGA) then the area of the ROVL is added to the OR. For example, if the ROVL is between 25 and 50% of the OR (and/or the LGA) then the area of the ROVL is added to the OR (or 50% of the area of the ROVL is added to the OR).

In at least one embodiment, LGA may be used to calculate and display a secondary larger displayed OR ring. For example, the user's location may be tracked to obtain an area which the user has been tracked to spend at least 75% (or 80%, or 90%, or etc.) of his logged time in, this area may be referred to as the user's local geographic area (or "LGA"). If there is a region of overlap between the calculated OR and the LGA (hereinafter ROVL), then the ROVL may be used to calculate and display a secondary larger displayed OR ring. For example, if the ROVL is equal to and/or greater than 25% of the OR (and/or the LGA) then the secondary larger displayed OR ring is displayed where the secondary OR is equal to OR (of the first smaller ring) added to the area of the ROVL.

In at least one embodiment, the secondary larger displayed OR ring is the only ring displayed making the secondary larger displayed OR ring the main OR ring. However, according to at least another embodiment, the secondary larger displayed OR ring may be a second ring displayed along with the first ring displayed thereby displaying two rings.

In at least one embodiment, when displaying both a first and second ring, the second ring may be calculated (and displayed) having the area equal to the area associated with the area of the first displayed OR plus 25% (or 33% or 50% or a value between 25% and 50%, etc.) of the area of the first displayed OR.

In at least one embodiment, the ROI and OR can be used/calculated interchangeably, or combined, or in any combination. For example, while the optimal radius (OR) may be determined/calculated by adding the average radius of the ROI to a standard deviation of the average distance the user covers, the OR may (in at least one embodiment) be equal to the ROI (OR=ROI(x), where x is the first iteration (initial calculation) of OR).

In regard to FIG. 5, it should be noted that resultants inside the ROI are illustrated with a X symbol and resultants outside the ROI are illustrated with a square ( ) symbol.

Figure 6:
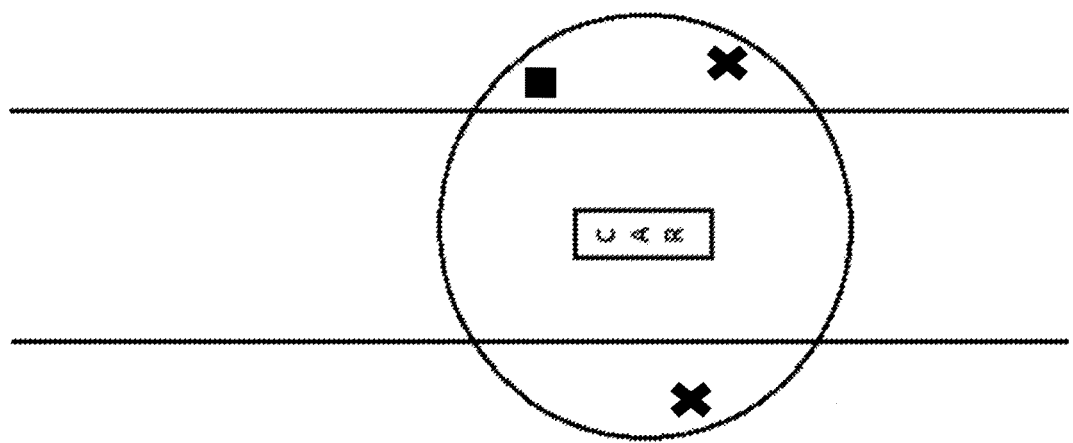
FIG. 6 is sample illustration of the display presented to the user according to one or more embodiments described herein.

As illustrated in at least FIG. 6 and according to at least one embodiment, newly added resultants may be displayed to the user when those newly added resultants enter the ROI. In regard to FIG. 6, it should be noted that previously displayed and still relevant resultants inside the ROI are illustrated with a X symbol and new resultants that have entered the ROI are illustrated with a square ( ) symbol. The new resultants may be displayed with a secondary icon (square symbol) for a predetermined period of time "ChangeT" (or displayed as a flashing in and out X symbol) before changing to an X symbol. The predetermined period of time may be calculated/determined based on the user pre-programmed metrics, an equation, etc. For example, at least the following equation may be used to calculate the predetermined period of time of displaying the new resultant symbol before changing to the X symbol by:

ChangeT=1 Mile/user's mph.

Another option for determining ChangeT (in seconds) is as follows:

ChangeT=5 seconds if user's mph>=40 mph,
10 seconds if user's >20 mph and <40 mph, and
15 seconds if user's mph<=20 mph.

According to at least one embodiment, when the user moves and causes a resultant to move from inside the ROI to outside the ROI, the system can change the display from a first icon to a second icon (e.g., X to ). However, in accordance with at least one embodiment, an X (the first icon) may be a brighten or highlighted view of an icon (a drink icon inside the ROI that has a higher illumination in the display than a drink icon outside the ROI that has a lower illumination in the display). In addition, in accordance with at least one embodiment, an X (the first icon) may be start flashing (for a predetermined amount of time) or change from a first color (e.g., red) to a second color (e.g., green).

Accordingly, when the search query is first executed multiple search results or locations may be generated inside the circle of OR. The circle is desired to always moves with the user (e.g., the car) at its center. In the example of at least FIG. 5, all the search results (e.g., coffee shops in Brentwood) are displayed inside the circle of OR. If the user misses out on the shops and moves on, and all the points in that location (e.g., Brentwood) are outside the circle of OR then the search happens again and now results for another location (e.g., Westwood) are generated inside the circle of OR (as illustrated in at least FIG. 7). Thus, monitoring and tracking the user's locations at different times influences the circle of interest (aka ROI) generated which has an influence on the search results generated in turn within that region and the results displayed are changed dynamically as and when the user moves thus leveraging the property of mobility and at the same time personalizing search.

Figure 7:
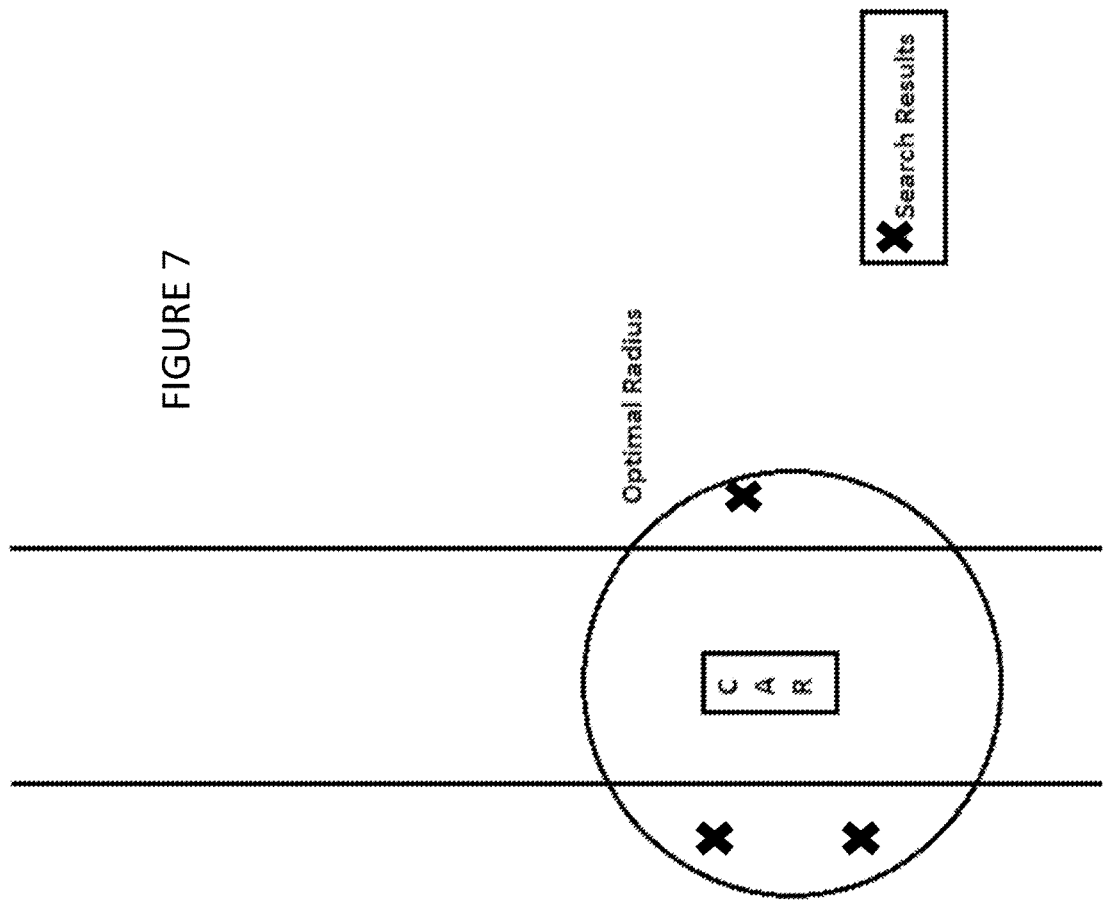
FIG. 7 is sample illustration of the display presented to the user according to one or more embodiments described herein.

In an example according to at least one embodiment, if DOR=3 and the user has three (old) resultants in the ROI but then keeps moving northbound where all three (old) resultants are no longer in the ROI and instead has three new resultants displayed. In FIG. 7, the three "old" resultants are displayed as Os where the three "new" resultants are displayed as Ns.

According to at least one embodiment, the system may also only display icons inside the ROI and restrict any resultants from displaying outside of the ROI. Furthermore, according to at least one embodiment, the system may use a first smaller ROI which displays resultants with a first icon type (or illumination, or etc.) and then a second larger ROI displaying a secondary set of resultants with a second icon type (or lower illumination, or etc.) within the first and second ROI and/or display resultants with a third icon type (or much lower illumination, or etc.) outside the second ROI.

It should be noted that the resultants (both inside and/or outside of the ROI) may be initially generated and then cached as search results when the search query was originally executed. This may be cached in the user device, and/or the database 298, and/or etc.

A new resultant may be highlight, for example, with a temporary flashing circle (or any other shape) around the newly resultant entering the user's ROI.

According to at least one embodiment, if there are no search results within the (initial/first) ROI when the application is first invoked each time (e.g., the first iteration/calculation of ROI being displayed and not when n is equal to or greater than 2 (ROI(n) where n≥2), all results generated are displayed without any filtering (without any ROI displayed) because this implies that all the search results lie outside the ROI and otherwise could frustrate the user.

According to at least one embodiment, if a user misses all the current results and reaches a place where the search query is calculated again and does not display any search results, the results of the last ROI which had search locations in the last ROI would be displayed to the user because this last ROI would be the nearest set of locations of interest from the current location and helpful to the user.

In 310, the input received from 260 may also work as a counter which may be used to increment the value of "n" in at least the following equation:

$$OR(n)=OR(n-1)*(1+(|Acc|*Tacc)/CS).$$

As illustrated, the OR is optimized using (the absolute value of) the acceleration Acc and the time to accelerate Tacc. Furthermore, the current OR which is "n" is calculated using the last OR calculated "n−1."

In 320, locations of the coffee shop are suggested based on OR calculated in 310 (e.g., DOR number of coffee shops (prioritized by any means, e.g., by popularity, by closest relationship to the search term, by closest location, etc.) located in the OR is displayed to the user). The display 299 may be updated based on the result(s) of 320. The result(s) of 320 are provided to at least Database 298 and 330.

For illustration purposes, if OR=1 mile as calculated from the user location and the first search result of coffee shops "C1" is at distance of 0.5 miles away from the user's determined location, the second search result of coffee shops "C2" at distance of 1.2 miles away from the user's determined location and the third search result of coffee shops "C3" at distance of 0.7 miles away from the user's determined location. As the distances of C2 and C3 are less than OR, only C1 is displayed.

In 330, the closest location score (CLS) is calculated based on factors relating the user, e.g., the wait time(s) and distance(s) between the coffee shop and the location from which search is performed. For example, according to at least one embodiment, the closest location score (CLS) may be calculated using the following formula:

$$CLS=(0.6*WT)+(0.4*(DWIOR/CS)), \text{ where}$$

WT is the wait time is the duration of time that a customer(s) wait(s) at the location (e.g., the coffee shop) before receiving the service (for example, the database can keep track of when user(s) enter into the service area (e.g., coffee shop) and then leave the service area which then provides (results in) wait times). The wait time may also be obtained from (third party) APIs like Google, Yahoo and the like, the Distance within the OR may be defined as DWIOR may be the distance from the user's determined location to the destination result and which is less than the distance of OR from the user's determined location, and CS is the Current Speed of the user device (e.g., user vehicle).

The result(s) of 330 (e.g., CLS) are provided to at least 340. In addition, according to at least one embodiment, if the user moves away from OR in 340, the result(s) of 340 are also provided to at least Database 298 and/or to 310 and/or stored locally in the user's device. Based on the data collected and/or calculated/determined in 350, the display results on Display 299 may be updated. Furthermore, according to at least one embodiment, if the user does not move away from OR in 340, the result(s) of 340 are provided to at least Database 298 and/or to 410 and/or stored locally in the user's device.

In 340, the determination is made if the user is moving away from the OR (and/or towards the OR). For example, determination may be made by the user's movement away from (and/or towards) the center point of the OR. Furthermore, according to at least one embodiment, if the user moves outside (or away from) OR ("YES"), then from 340 the process goes back (or feeds back) to 310 so that OR is calculated again (e.g., recalculated). However, according to at least one embodiment, if the user does not move from OR ("NO"), the process proceeds to 410.

Similarly, at least one embodiment, if the user moves towards OR ("NO"), then from 340 the process goes back (or feeds back) to 310 so that OR is calculated again (e.g., recalculated). However, according to at least one embodiment, if the user does not move toward OR ("YES"), the process proceeds to 410.

Figure 4:
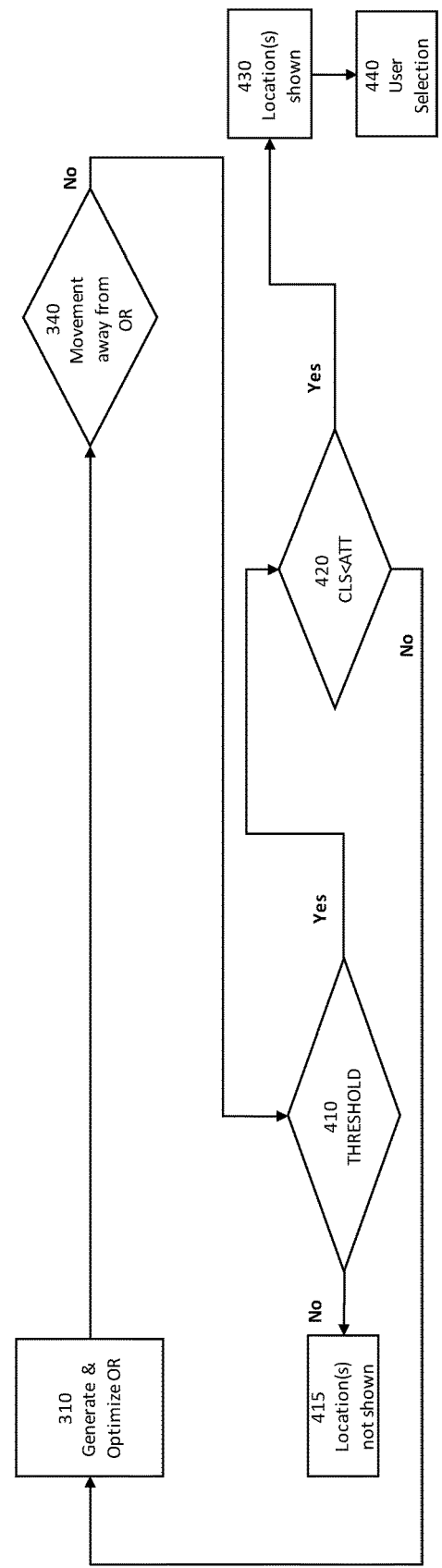
FIG. 4 is a functional block diagram illustrating the optimization of OR according to one or more embodiments described herein.

FIG. 4 is a functional block diagram illustrating the optimization of OR according to one or more embodiments described herein.

The procedure(s)/step(s) in at least FIG. 4 provide numerous benefits. For example, by optimizing the OR, the system generates better accuracy and avoids multiple searches.

In 410, metrics/data regarding the resultants of the search query are obtained and/or retrieved (e.g., from the database and/or the user device, etc.) and compared to a threshold. More specifically, in 410, metrics/data for each resultants can be prestored (e.g., stored and access in database 298) and/or retrieved from a third party (e.g., Google API) and the metrics/data may include information like the times of day/week (real time, pre-stored, estimated, etc.) that the resultant location(s) is/are busy (popular) and hence wait times may be excessive or long (and making some locations less preferable and/or undesirable to a user than other locations). Accordingly, the information that is obtained and/or retrieved and then compared to a threshold, and outputs a positive indicator (ACK) to 420 if it exceeds (or meets and exceeds) the threshold and/or outputs a negative indicator (NACK) to 415 if it meets or is less than/below (or less than/below) the threshold.

For example, if the time of visit to the coffee shop as obtained (e.g., from Google API) is identified to be a popular business time (or high customer volume time), then the result(s) of 410 are provided to at least 420. If the time of visit to the coffee shop as obtained from google API is not a popular business time, the result(s) of 410 are provided to 415. In other words, if the popular time of the Starbucks on 123 Broadway Blvd is obtained to be in the 80 percentile of being in the "busy" time and the threshold was pre-set to 75% (may be preset by the user in the system, and/or preset in the database/user device, and/or etc.) then a positive ACK is sent to 420 and/or a NACK is sent to 415.

In 420, in response to receiving an (ACK) indicator (or an instruction) from 410, then a comparison between variables of the system (e.g., CLS and ATT) is made (or variable(s) of the system are compared to a threshold) and, based on the result of said comparison, output(s) are provided to 430 and/or 310.

For example, in 420, a comparison between CLS and ATT may be made. Accordingly, according to at least one embodiment, if CLS<ATT (or CLS<=ATT), then the result(s) of 420 are provided to at least 430 (e.g., a positive indicator (ACK) is provided). If CLS>=ATT (or CLS>ATT), then the result(s) of 410 are provided to at least 310 (e.g., a negative indicator (NACK)).

In 420, if CLS<ATT ("YES"), then the location results are displayed to the user (430). However, in 420, if CLS is not <ATT ("NO"), then an optimized OR needs to be generated (e.g., recalculated) and the result of 420 is hence provided to 310 so the OR may be optimized (e.g., regenerated/recalculated).

In 430, in response to receiving an (ACK) indicator (or an instruction) from 420, the location(s) is/are shown and then the result(s) of 410 are provided to at least 440 and/or display 299 and/or stored locally in the user's device.

In 440, various search results are displayed with an option for the user to choose/select the best coffee shop based on the user's preference from Display 299.

In 415, in response to receiving a (NACK) indicator (or an instruction) from 410, the location(s) is/are filtered out and not shown on Display 299.

Figure 8:
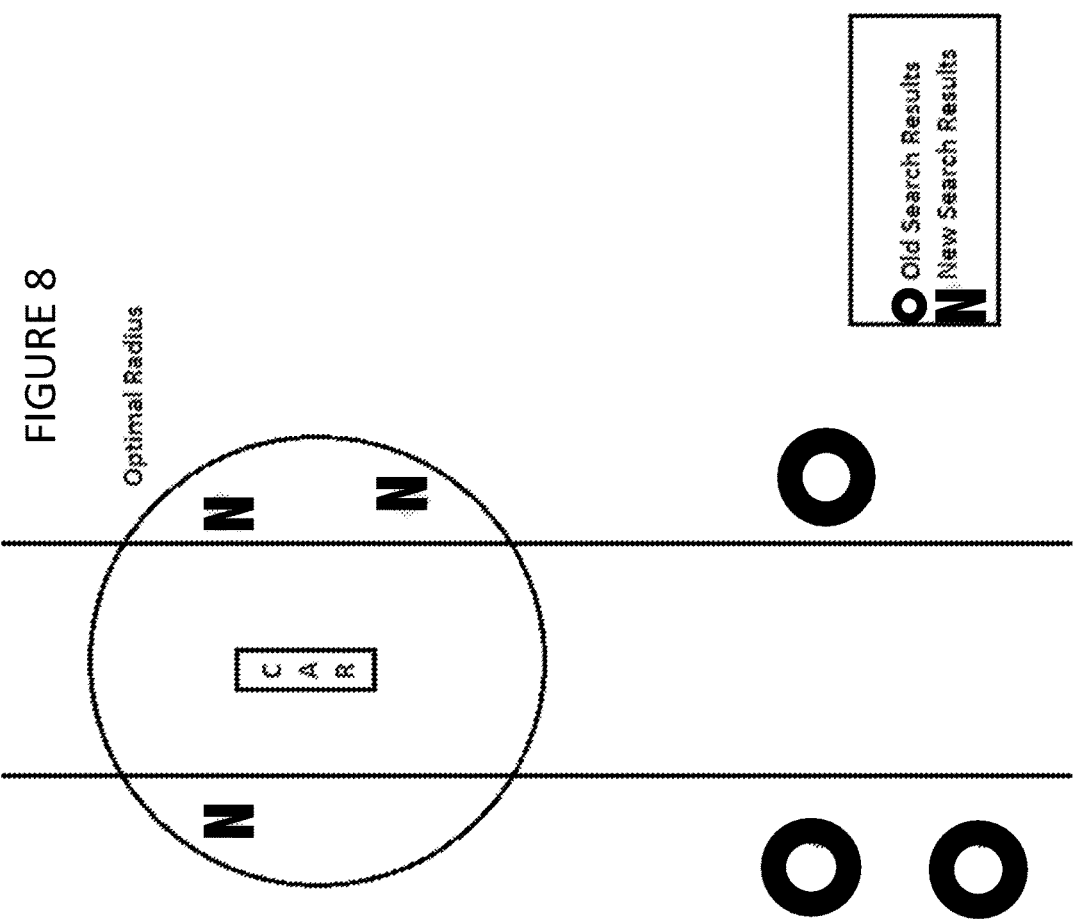
FIG. 8 is sample illustration of the display presented to the user according to one or more embodiments described herein.

Embodiments of the invention provide solutions for address the issue(s) of mobility by implementing aspects of this location/content-based searching. Google Maps API and/or other existing/similar tools may be leveraged for mobile search by implementing aspects and/or embodiments of the present invention. For example, there exists an API limit of 8 results that are returned for any search query made that can be locally cached. The process as illustrated in FIG. 8 may be implemented along with or in addition to tools like Google Maps API in addition to being implemented along with or in addition to any embodiment and/or aspect of the invention. As and when search results enter and leave the ROI, Mobile AJAX is used to locally refresh that part of the map to generate updated results which are further displayed to the user. Based on this procedure, snapshots for a search of "libraries" and/or "library" (search word(s)) made in "Westwood" (search location) at a particular coordinate using different radii for the ROI provides the following example:

Westwood Branch LIBRARY
1246 Glendon Avenue
Los Angeles, Calif.
UCLA Charles E Young Research LIBRARY
100 Stein Plaza
Los Angeles, Calif.
Selectracks
10327 Santa Monica Boulevard
Los Angeles, Calif.
West Los Angeles Regional LIBRARY
11360 Santa Monica Boulevard
Los Angeles, Calif.

Barrister Research Library
1801 Century Space Park E #2500
Los Angeles, Calif.
University of California Los Angeles Law Library
385 Times Plaza
Los Angeles, Calif.
Louise M Darling Biomedical Library
12-077 Center for Health Sciences
Los Angeles, Calif.

This list of libraries in Westwood is based on the location coordinates 34.05611, 118.42972 and provides all result (e.g., a maximum of 8 results) within a OR of 1.24 miles of the location.

According to an embodiment, when a user has been logged/recorded to be in (or mainly be in, e.g., at least 90 or 95% of the time the device is capturing data) a certain geographical area (a city, a state, a town, a certain radius, etc.) for a predetermined duration of time ((at least) a month, (at least) three months, (at least) six months, (at least) a year, etc.) and has been recorded to pass by (and not stop by) certain specific locations (e.g., coffeeshops) and/or not search for those specific locations, preference to certain locations outside of the certain geographical area may be given. For example, if a user who has been in Santa Monica for a said given period of time (e.g., at least 6 months) and the user has not searched for coffee and/or has not stopped by any coffee shops (or has not stopped in at least 95% of the local coffee shops) in said certain geographical area and the user is heading towards another geographical area (towards Westwood and away from Santa Monica based on the user's continuous change in location), more coffee shops in Westwood may be dynamically displayed to the user instead of coffee shops in Santa Monica.

One of many problems with device (e.g., cell phone) usage is providing energy efficiency in said device. An application that drains so much of the power out of the battery of a device requires constant recharging and thus is extremely inconvenient and highly undesirable for users. Embodiments of the present invention may filter search results so that the present invention offers more a precise, personal and adaptive result set in a dynamic fashion with local refreshes frequently which provides an impact on power consumption.

Embodiments of the present invention present invention may use numerous methods for providing a means for decreasing power consumption. For example, an embodiment of the present invention, the present invention may use at least a Rate Adaptive Positioning System (RAPS) algorithm (as known in the art) to help reduce the power consumed.

This Rate Adaptive Positioning System (RAPS) algorithm has at least two facets. First, the accelerometer of the user device may be duty-cycled. Second, the GPS sensor of the device (e.g., mobile phone) which is adaptively duty-cycled based on estimation of user's velocity using the database 298 that was used earlier to compute the ROI.

The accelerometer of the present invention may be pre-programmed to be duty-cycled at any percentage, but it may be preferable to have a duty cycle between 15 and 50%. More specifically, the process set forth in FIG. 1 can be duty-cycled in order to reduce the power consumed. For example, the accelerometer may be duty-cycled at 25% with an 'ON' time of $t_{ON}$=30 seconds and an 'OFF' time of $t_{OFF}$=90 seconds. As another example, the accelerometer may be duty-cycled at 33% with an 'ON' time of $t_{ON}$=20 seconds and an 'OFF' time of $t_{OFF}$=60 seconds. As a further example, the accelerometer may be duty-cycled at 50% with an 'ON' time of $t_{ON}$=15 seconds and an 'OFF' time of $t_{OFF}$=15 seconds.

According to at least one embodiment, the user's average mph "AMPH" may be obtained and used with the accelerometer. For example, the accelerometer may be duty-cycled at AMPH % with an 'ON' time of $t_{ON}$=AMPH seconds and an 'OFF' time of $t_{OFF}$=AMPH seconds.

According to at least one embodiment, the user's average mph "AMPH" may be obtained and used with the accelerometer. For example, the accelerometer may be duty-cycled at Va*AMPH % with an 'ON' time of $t_{ON}$=Va*AMPH seconds and an 'OFF' time of $t_{OFF}$=Va*AMPH seconds, where Va is a positively valued variable (Va=1.00, 2.00, 3.00, or . . . ). Va may also be assigned the same value as the DOR.

It should be noted that the estimated velocity may be used to approximately estimate the distance traveled by the user and thus used to calculate (e.g., estimate) the new location of the user. Accordingly, the estimated location value can be referred to as the "ELV".

In at least one embodiment, the GPS sensor of device (e.g., mobile phone) is set to the 'OFF' state. When the determination is made by the system that the location of the user attains a degree of uncertainty, the GPS sensor is automatically set to an 'ON' state. The uncertainty may be defined when the system calculates 5 ELVs. In response to this uncertainty level being reached, the GPS is set to the 'ON' state and the (accurate) current location of the user is obtained. In at least one embodiment, the current location of the user is obtained only when both the accelerometer and the GPS are in their respective 'ON' states and the 5 ELVs in between two invokes of the GPS are just estimates.

In at least one embodiment, the location estimates are all logged/stored in the database 298 and/or the user device and/or any other location. However, in at least one embodiment, when the location estimates match the GPS provided location coordinates with an error rate of 10% or less, then the location estimates are all also logged/stored in the database 298. In addition, when the location estimates match the GPS provided location coordinates with the error rate greater than 10%, only the GPS provided coordinates are pushed (logged/stored) in the database 298 and/or the user device and/or any other location. This process may be referred to as detecting the current state (e.g., of the user device).

Once the detecting the current state is over, the GPS of the phone will again be set to the 'OFF' state. Accordingly, by at least the use of the RAPS algorithm, the number of times the GPS is invoked may be reduced which is likely the main reason for draining the battery life of most if not all devices.

In at least one embodiment, the cell tower-RSS blacklisting may be used to show the presence of GPS at the current location of the user device. Cell tower-RSS blacklist is a list of GPS readings that are successful and that have timed out. In the absence of GPS, e.g., when GPS is either not working or is switched off or not present on the device, the GPS sensor is set to the 'OFF' state. The RAPS algorithm may also include a module for Bluetooth synchronization with the help of other peers (e.g., other users of the system) as illustrated as follows. In an example where two devices have Bluetooth activated and the two devices are within 10 meters distance from each other, and if the GPS of one device is 'ON', then the other (second) device can get the same via Bluetooth.

However, expecting a peer (e.g., another user of the system) in a radius of 10 in which is the range of Bluetooth transmission is very difficult considering the random mobility of user(s). The RAPS algorithm has been shown to save up to the factor of 3.5 times the battery life of the phone as compared to the case when the GPS is always 'ON'.

Moreover, the database updates that occur as a part of RAPS have a great impact on the ROI generated because the current location and timestamp of the user device that goes into the database 298 which influences the result generated by the Haversine formula. This can directly affect the computations made (e.g., the OR computation which now accounts for the current speed of the user and is thus a more accurate reflection of the current state).

In an embodiment, another efficiency measure that may be used to handle the situation when the battery life falls below a certain predetermined amount (e.g., ¼th of the total battery life). For example, when the predetermined criteria is met (e.g., the battery life falls below a certain predetermined amount), the GPS sensor may be automatically set to the 'OFF' state and the GPS sensor is invoked as less as possible in order to minimize the power draining due to use of the GPS. In at least an embodiment, this may be implemented by scaling up the radius based on, for example, the following formula:

$$OR(n)=OR(n-1)*(1+(|Acc|*Tacc)/(CS*BLF)), \text{ where}$$

BLF is the battery life fraction, where

Battery Life Fraction (BLF) is the ratio of Battery Life remaining after the battery is 100% charged and Total Battery Life (TBL) at 100% charge.

It should be noted that modulus may be used to account for cases of negative acceleration (in this equation and the other equations using acceleration).

Figure 9:
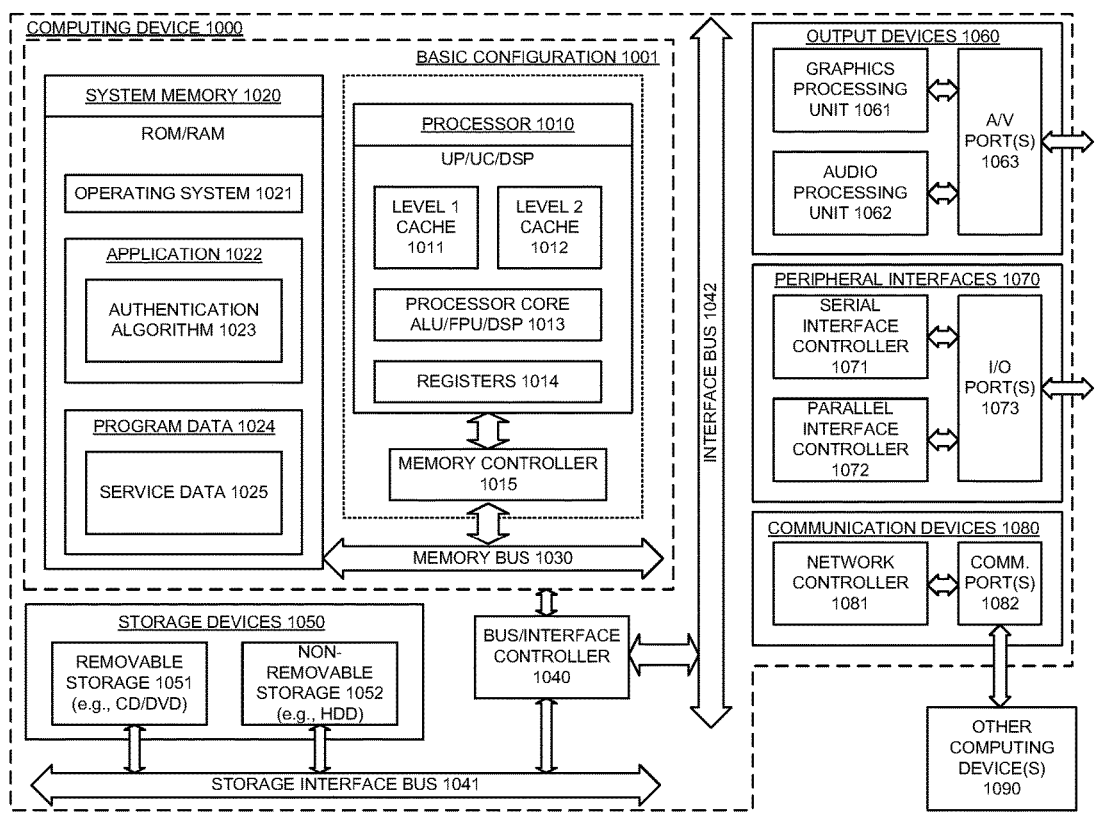
FIG. 9 is a circuit diagram of one aspect of a computing device/controller 1000 that works in conjunction with the elements of the present disclosure.

FIG. 9 is a circuit diagram of one aspect of a computing device/controller 1000 that works in conjunction with the elements of the present disclosure. In a very basic configuration of computing device 1000, the computing device 1000 typically includes one or more processors 1010 and a system memory 1020. A memory bus 1030 can be used for communications between the processor 1010 and the system memory 1020.

Depending on the desired configuration, the one or more processor 1010 of computing device 1000 can be of any type including but not limited to a microprocessor, a microcontroller, a digital signal processor, or any combination thereof. Processor 1010 can include one more levels of caching, such as a level one cache 1011 and a level two cache 1012, a processor core 1013, and registers 1014. The processor core 1013 can include an arithmetic logic unit (ALU), a floating point unit (FPU), a digital signal processing core (DSP Core), or any combination thereof. A memory controller 1015 can also be used with the processor 1010, or in some implementations the memory controller 1015 can be an internal part of the processor 1010.

Depending on the desired configuration, the system memory 1020 can be of any type including but not limited to volatile memory (such as RAM), non-volatile memory (such as ROM, flash memory, etc.) or any combination thereof. System memory 1020 typically includes an operating system 1021, one or more applications 1022, and program data 1024. Application 1022 includes an authentication algorithm 1023. Program Data 1024 includes service data 1025.

Computing device 1000 can have additional features or functionality, and additional interfaces to facilitate communications between the basic configuration 1001 and any required devices and interfaces. For example, a bus/interface controller 1040 can be used to facilitate communications between the basic configuration 1001 and one or more data storage devices 1050 via a storage interface bus 1041. The data storage devices 1050 can be removable storage devices 1051, non-removable storage devices 1052, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data System memory 1020, removable storage 1051 and non-removable storage 1052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 1000. Any such computer storage media can be part of the computing device 1000.

Computing device 1000 can also include an interface bus 1042 for facilitating communication from various interface devices (e.g., output interfaces, peripheral interfaces, communication interfaces, etc.) to the basic configuration 1001 via the bus/interface controller 1040. Example output devices 1060 include a graphics processing unit 1061 and an audio processing unit 1062, which can be configured to communicate to various external devices such as a display or speakers via one or more A/V ports 1063. Example peripheral interfaces 1070 include a serial interface controller 1071 or a parallel interface controller 1072, which can be configured to communicate with external devices such as input devices (e.g., keyboard, mouse, pen, voice input device, touch input device, etc.) or other peripheral devices (e.g., printer, scanner, etc.) via one or more I/O ports 1073. An example communication device 1080 includes a network controller 1081, which can be arranged to facilitate communications with one or more other computing devices 1090 over a network communication via one or more communication ports 1082. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

It should be noted that the specifying circuit 112, the buffer specifier 114, the segmenter 311, the transformer 312, the periodogram computer 313, the delay assessment circuit 118, the pre-processors 110 and 111, the first and second threshold circuit 130 and 131, and/or the first and the second shift register 150, 151 may work in conjunction with computing device 600. In addition, it should be noted that the specifying circuit 112, the buffer specifier 114, the segmenter 311, the transformer 312, the periodogram computer 313, the delay assessment circuit 118, the pre-processors 110 and 111, the first and second threshold circuit 130 and 131, and/or the first and the second shift register 150, 151 may be comprised directly of the elements of computing device 1000 (i.e., elements 1010 and/or 1020).

Computing device 1000 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Exemplary embodiments are shown and described in the present disclosure. It is to be understood that the embodiments are capable of use in various other combinations and environments and are capable of changes or modifications within the scope of the inventive concept as expressed herein. Some such variations may include using programs stored on non-transitory computer-readable media to enable computers and/or computer systems to carry our part or all of the method variations discussed above. Such variations are not to be regarded as departure from the spirit and scope of the invention, and all such modifications as would be obvious to one skilled in the art are intended to be included within the scope of the following claims.

We claim:

1. An apparatus comprising:
 a receiving circuit and/or device configured to receive at least:
  a first set of data received in a single transmission wherein said first set of data received in said single transmission includes at least:
   i) a first search term corresponding to a first search query inputted by a user,
   ii) a second search term corresponding to a second search query inputted by the user, and
   iii) first location data corresponding to a first location of said user, and
  a second set of data received in a single transmission wherein said second set of data received in said single transmission includes at least:

i) second location data corresponding to a second location of said user,
  wherein the second set of data received in a single transmission is received after the first set of data received in a single transmission;
a calculation circuit and/or device configured to calculate at least:
  a number of display results (DOR) based on calculation using said first location data,
    wherein DOR is equal to or greater than 3,
  an average distance traveled (ADT) based on using said first location data and/or said second location data,
  an average speed (AS) based on using said ADT,
  an average time required (ATR) based on said DOR and/or said AS,
  a first optimal radius (OR1) based on said AS and/or said ATR,
  a region of overlap (ROVL) based on at least said first location data and said second location data,
  a first revised optimal radius (OR1a), wherein OR1a is equal to OR1 added to ROVL,
  a second optimal radius (OR2) based on OR1, wherein OR2 is equal to a value of 1.25*OR1, or a value of equal to 1.50*OR1 or a value between 1.25*OR1 and 1.50*OR1, and
  a second revised optimal radius (OR2a) based on OR1a, wherein OR2a is equal to a value of 1.25*OR1a, or a value of equal to 1.50*OR1a or a value between 1.25*OR1a and 1.50*OR1a, and
a transmitting circuit and/or device configured to transmit at least:
  first identification data, wherein said first identification data being one of a first icon, a first thumbnail or a first image, wherein said first icon, said first thumbnail or said first image corresponding to said first search term,
  second identification data, wherein said second identification data being one of a second icon, a second thumbnail or a second image, wherein said second icon, said second thumbnail or said second image corresponding to said second search term,
  a first number of search results for said first identification data, and
  a second number of search results for said second identification data,
    wherein said first number of search results for said first identification data and said second number of search results for said second identification data are locations results located within said first revised optimal radius and/or said second revised optimal radius,
    wherein the total number of search results is equal to the sum of said first number of search results and said second number of search results,
    wherein said total number of search results is equal to or greater than DOR, and
    wherein said first identification data is different data than said second identification data,
  the first revised optimal radius, and
  the second revised optimal radius.

2. A method comprising:
receiving a first set of data received in a single transmission wherein said first set of data received in said single transmission includes at least:
  i) a first search term corresponding to a first search query inputted by a user,
  ii) a second search term corresponding to a second search query inputted by the user, and
  iii) first location data corresponding to a first location of said user;
receiving a second set of data received in a single transmission wherein said second set of data received in said single transmission includes at least:
  i) second location data corresponding to a second location of said user,
  wherein the second set of data received in a single transmission is received after the first set of data received in a single transmission;
calculating a number of display results (DOR) based on calculation using said first location data,
  wherein DOR is equal to or greater than 3;
calculating an average distance traveled (ADT) based on using said first location data and/or said second location data;
calculating an average speed (AS) based on using said ADT;
calculating an average time required (ATR) based on said DOR and/or said AS;
calculating a first optimal radius (OR1) based on said AS and/or said ATR;
calculating a region of overlap (ROVL) based on at least said first location data and said second location data;
calculating a first revised optimal radius (OR1a), wherein OR1a is equal to OR1 added to ROVL;
calculating a second optimal radius (OR2) based on OR1, wherein OR2 is equal to a value of 1.25*OR1, or a value of equal to 1.50*OR1 or a value between 1.25*OR1 and 1.50*OR1;
calculating a second revised optimal radius (OR2a) based on OR1a, wherein OR2a is equal to a value of 1.25*OR1a, or a value of equal to 1.50*OR1a or a value between 1.25*OR1a and 1.50*OR1a,
transmitting first identification data, wherein said first identification data being one of a first icon, a first thumbnail or a first image, wherein said first icon, said first thumbnail or said first image corresponding to said first search term;
transmitting second identification data, wherein said second identification data being one of a second icon, a second thumbnail or a second image, wherein said second icon, said second thumbnail or said second image corresponding to said second search term;
transmitting a first number of search results for said first identification data;
transmitting a second number of search results for said second identification data,
  wherein said first number of search results for said first identification data and said second number of search results for said second identification data are locations results located within said first revised optimal radius and/or said second revised optimal radius,
  wherein the total number of search results is equal to the sum of said first number of search results and said second number of search results,
  wherein said total number of search results is equal to or greater than DOR, and
  wherein said first identification data is different data than said second identification data;
transmitting the first revised optimal radius; and
transmitting the second revised optimal radius.

3. A non-transitory computer readable medium having instructions stored thereon, such that when the instructions are read and executed by one or more processors, said one or more processors is configured to perform at least the steps of:

receiving a first set of data received in a single transmission wherein said first set of data received in said single transmission includes at least:
iv) a first search term corresponding to a first search query inputted by a user,
v) a second search term corresponding to a second search query inputted by the user, and
vi) first location data corresponding to a first location of said user;

receiving a second set of data received in a single transmission wherein said second set of data received in said single transmission includes at least:
ii) second location data corresponding to a second location of said user, wherein the second set of data received in a single transmission is received after the first set of data received in a single transmission;

calculating a number of display results (DOR) based on calculation using said first location data,
wherein DOR is equal to or greater than 3;

calculating an average distance traveled (ADT) based on using said first location data and/or said second location data;

calculating an average speed (AS) based on using said ADT;

calculating an average time required (ATR) based on said DOR and/or said AS;

calculating a first optimal radius (OR1) based on said AS and/or said ATR;

calculating a region of overlap (ROVL) based on at least said first location data and said second location data;

calculating a first revised optimal radius (OR1a), wherein OR1a is equal to OR1 added to ROVL;

calculating a second optimal radius (OR2) based on OR1, wherein OR2 is equal to a value of 1.25*OR1, or a value of equal to 1.50*OR1 or a value between 1.25*OR1 and 1.50*OR1;

calculating a second revised optimal radius (OR2a) based on OR1a, wherein OR2a is equal to a value of 1.25*OR1a, or a value of equal to 1.50*OR1a or a value between 1.25*OR1a and 1.50*OR1a, transmitting first identification data, wherein said first identification data being one of a first icon, a first thumbnail or a first image, wherein said first icon, said first thumbnail or said first image corresponding to said first search term;

transmitting second identification data, wherein said second identification data being one of a second icon, a second thumbnail or a second image, wherein said second icon, said second thumbnail or said second image corresponding to said second search term;

transmitting a first number of search results for said first identification data;

transmitting a second number of search results for said second identification data,
wherein said first number of search results for said first identification data and said second number of search results for said second identification data are locations results located within said first revised optimal radius and/or said second revised optimal radius,
wherein the total number of search results is equal to the sum of said first number of search results and said second number of search results,
wherein said total number of search results is equal to or greater than DOR, and
wherein said first identification data is different data than said second identification data;

transmitting the first revised optimal radius; and
transmitting the second revised optimal radius.

* * * * *